Feb. 4, 1958
W. W. FRIEDRICH
2,821,968
INTERNAL COMBUSTION ENGINE
Filed Aug. 1, 1956
5 Sheets-Sheet 1
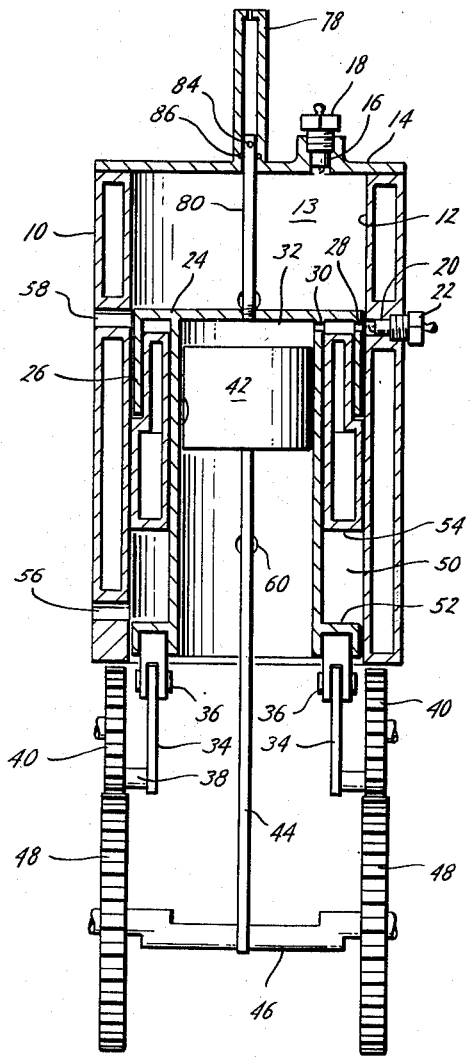
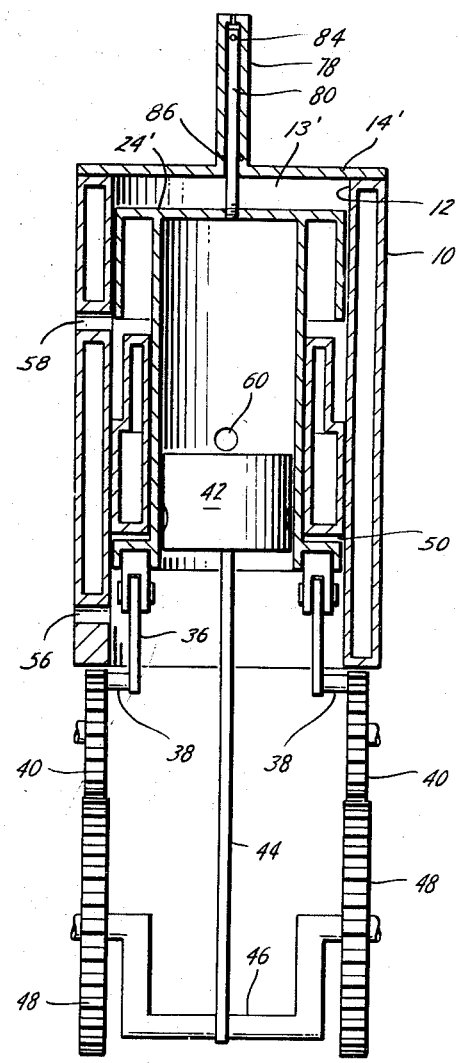
William W. Friedrich
INVENTOR.
BY Charles E. Lightfoot
ATTORNEY

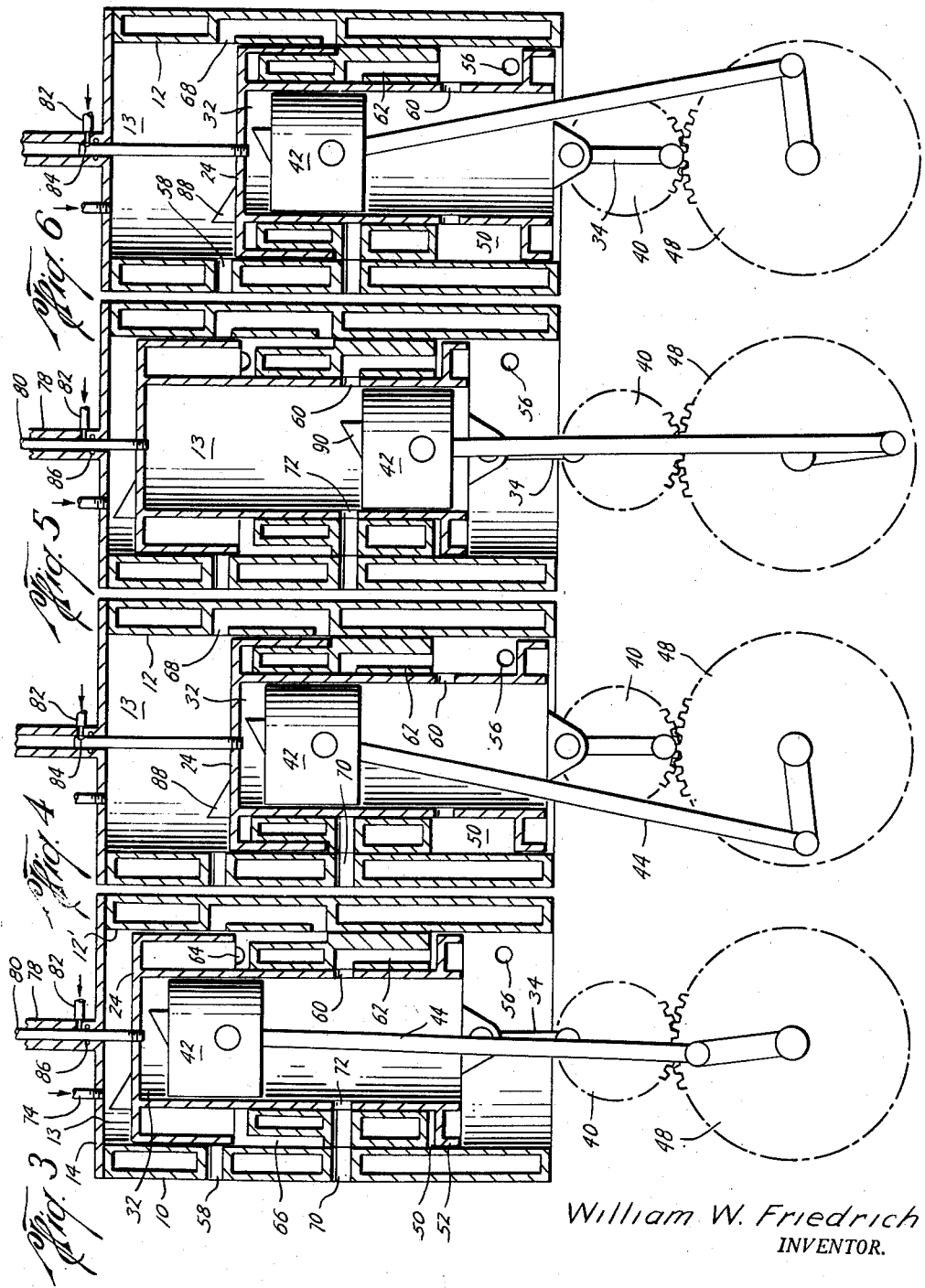

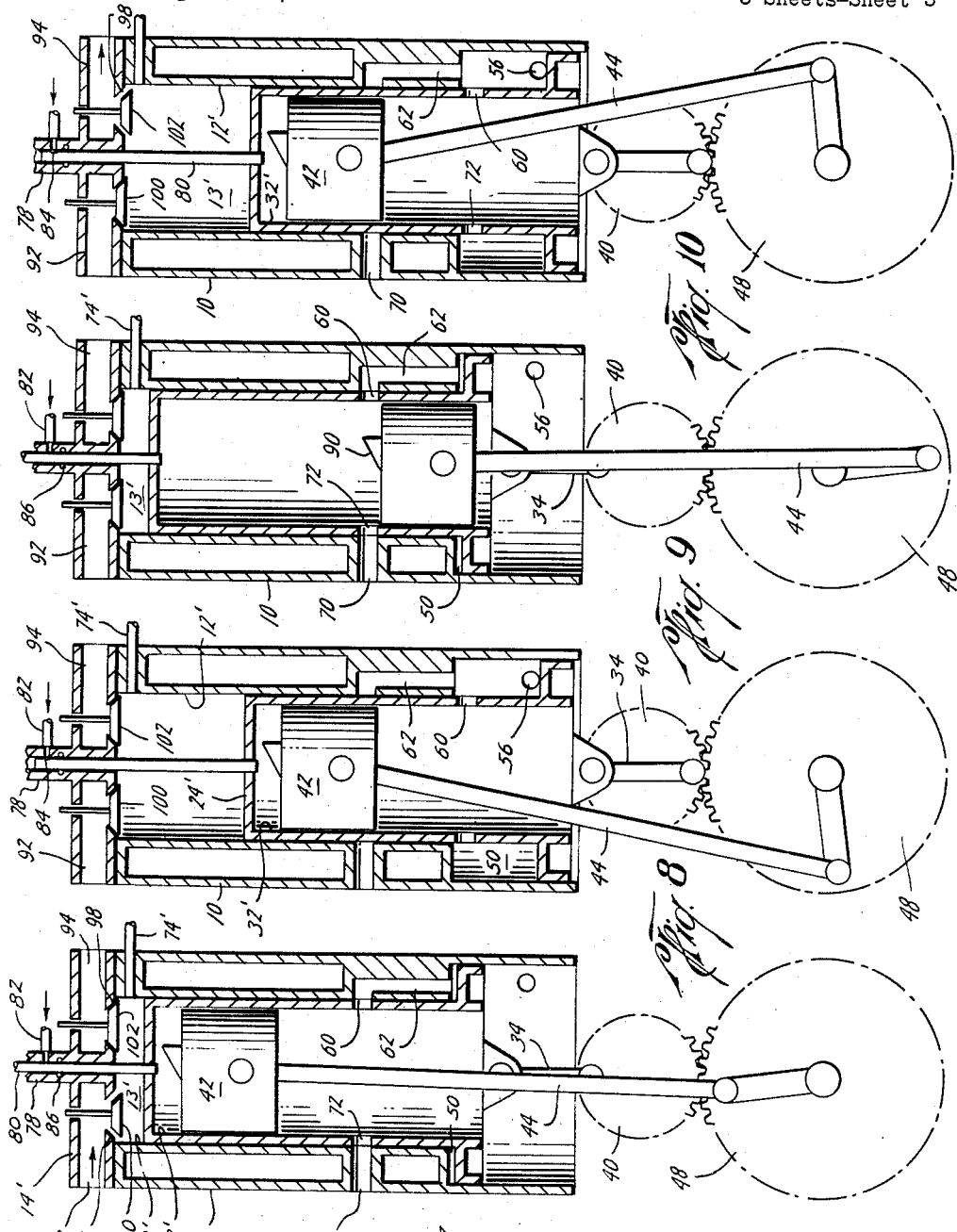

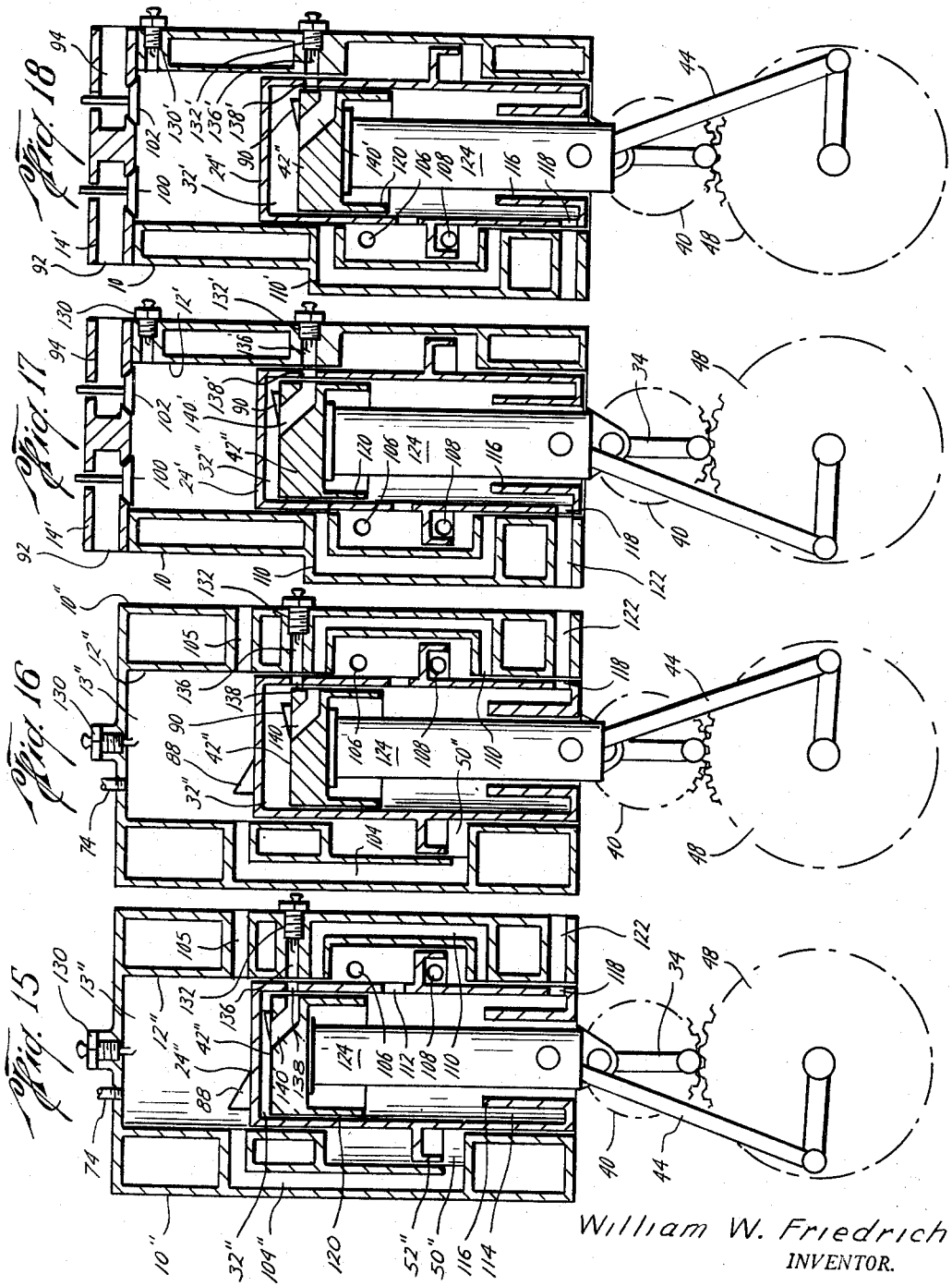

Feb. 4, 1958  W. W. FRIEDRICH  2,821,968
INTERNAL COMBUSTION ENGINE
Filed Aug. 1, 1956  5 Sheets-Sheet 5
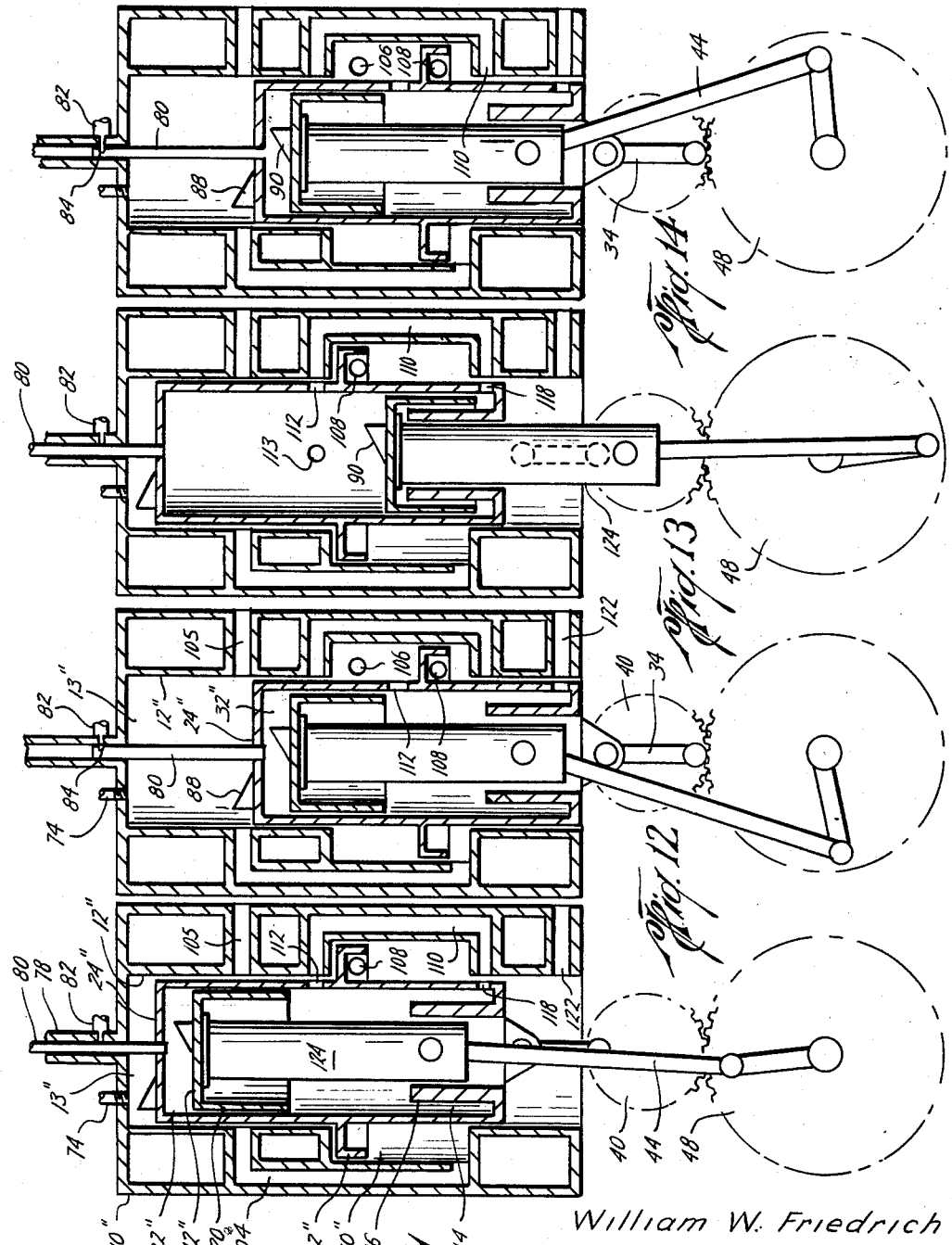
William W. Friedrich
INVENTOR.
BY
Charles E. Lightfoot
ATTORNEY

United States Patent Office 2,821,968
Patented Feb. 4, 1958

2,821,968
INTERNAL COMBUSTION ENGINE
William W. Friedrich, Houston, Tex.
Application August 1, 1956, Serial No. 601,397
7 Claims. (Cl. 123—50)

This invention relates to an internal combustion engine and more particularly to an engine which is constructed for either two cycle or four cycle operation or for a combination of two cycle and four cycle operation.

The invention has for an important object the provision of an internal combustion engine having a cylinder and an outer or sleeve piston movable in the cylinder and within which an inner piston is movable, there being an explosion chamber in the cylinder between the outer piston and the cylinder and another explosion chamber in the outer piston between the inner and outer pistons.

Another object of the invention is to provide an internal combustion engine having the structure and arrangement of the cylinder and pistons referred to above and wherein means is embodied for causing one of the pistons to perform a compression stroke during a power stroke of the other of said pistons.

A further object of the invention is the provision of an internal combustion engine of the type mentioned including means for connecting the pistons in driving relation to a drive shaft in a manner to cause the force exerted during a power stroke of either of the pistons to be exerted at a point substantially past dead center, whereby starting of the engine is facilitated.

Another object of the invention is to provide an engine of the kind referred to wherein a more nearly continuous application of power to a drive shaft may be accomplished than is possible by the use of an engine having one piston per cylinder.

Another object of the invention is to provide an internal combustion engine having inner and outer pistons which reciprocate on the same axis and wherein the force exerted at the beginning of a power stroke of the inner piston takes place when the lower end of the piston rod of the inner piston is substantially displaced from the dead center position of said lower end, whereby the leverage of said power stroke is greatly increased.

The invention also contemplates an internal combustion engine which is designed for use either as a diesel engine or as an engine employing electric ignition of the conventional type or as a combined diesel and electric ignition engine.

The above and other important objects and advantages of the invention may best be understood from the following detailed description, constituting a specification of the same, when considered in conjunction with the annexed drawings, wherein:

Figure 1 is a front elevational view, partly in cross-section, illustrating a preferred form of the invention and showing an engine of the gasoline powered type having two pistons, one movably disposed within the other and arranged for two-cycle operation of both of the pistons;

Figure 2 is a view similar to that of Figure 1 showing an engine of the diesel type wherein the pistons are both arranged for two-cycle operation;

Figures 3 to 6, inclusive, are side elevational views, partly in cross-section, illustrating an engine of the diesel type wherein the pistons are both arranged for two-cycle operation, the pistons being shown in successive positions which they occupy during the running of the engine;

Figures 7 to 10, inclusive, are views similar to those of Figures 3 to 6, illustrating an engine of the diesel type in which the outer piston is arranged for four-cycle operation while the inner piston is arranged for two-cycle operation;

Figures 11 to 14, inclusive, are views similar to those of Figures 3 to 6, illustrating a somewhat modified form of the invention;

Figures 15 and 16 are views similar to those of Figures 14 and 12, respectively, illustrating a further modified form of the invention; and Figures 17 and 18 are views similar to those of Figures 10 and 8, respectively, illustrating a still further modified form of the invention.

Referring now to the drawings in greater detail, the engine of the invention has a cylinder block 10 provided with a bore 12 forming the cylinder of the engine, it being understood that the block may be constructed in the usual manner with conventional cooling means, such as water passages or heat dissipating fins, not shown. The upper end portion 13 of the cylinder 12 constitutes an upper or outer combustion chamber of the engine.

The cylinder 12 is provided at its upper end with a cylinder head 14 of usual construction having a spark plug opening 16 into which a spark plug 18 is inserted by which ignition of fuel within the cylinder may be accomplished in the usual manner. A side opening 20 is also provided in the cylinder into which a spark plug 22 is inserted to accomplish ignition in the inner combustion chamber of the engine.

Within the cylinder 12 an outer, or upper, sleeve-like piston 24 is movably disposed, having a cylindrical, outer skirt portion 26 extending downwardly from the upper end of the piston, and which may be provided with the usual external piston ring grooves and piston rings, not shown, whereby a fluid tight seal is established between the piston and the inner surface of the cylinder. Near the upper end of the piston 24 the skirt 26 has a side opening 28 and a similar opening 30 is provided in the wall of the sleeve which is in communication with the opening 28 and with the interior of the sleeve, these openings being for the purpose of allowing fuel in the inner or lower combustion chamber 32 at the upper end of the sleeve to be ignited by the spark plug 22.

At its lower end the sleeve-like piston 24 is pivotally connected by suitable connecting rods 34, pivotally attached to the sleeve as indicated at 36, to studs 38 carried by small gears 40 in a manner to rotate the gears upon reciprocation of the sleeve.

Within the sleeve-like piston 24 an inner, or lower, a piston 42 is movably disposed, which is connected by a piston rod 44 of usual construction to a crank 46 forming a part of a crankshaft upon which large gears 48 are mounted for rotatoin with the shaft, the gears 48 being in mesh with the gears 40 and having a diameter which is twice the diameter of the gears 40.

Within the lower end portion of the cylinder block 10 an internal annular chamber 50 is formed between an external, annular, lower end enlargement 52 on the sleeve-like piston 24 and an internal, annular projection 54 on the cylinder block, which chamber is increased upon downward movement of the outer piston and decreased upon upward movement of the same. An intake port 56 is provided in the cylinder block leading from the exterior thereof into the interior of the chamber 50 when the outer piston is in its downmost position. An exhaust port 58 is also provided in the cylinder block, which is in communication at its inner end with the interior of the combustion chamber 12, when the sleeve-like piston 24 is in its downmost position, and which is closed by the piston 24 when the same moves upwardly in the cylinder.

The piston 24 has a port 60, which is positioned to be in registration with a passageway 62 in the cylinder block, leading from the chamber 50 to admit air to the inner or lower combustion chamber 32, when the inner piston 42 is in its lowermost position, relative to the outer piston 24, and which is also positioned to admit air from the chamber 50 into the interior of the piston 24, beneath the inner piston 42, when the inner and outer pistons are in their upmost positions in the cylinder.

In the form of the invention illustrated in Figures 3 to 6, inclusive, the cylinder block has an inlet port 64, which is positioned to be closed by the skirt portion 26 of the piston 24, upon downward movement of the piston, and which is open when the piston 24 reaches its uppermost position in the cylinder. The inlet port 64 opens into a chamber 66, formed between the piston 24 and the internal projection 54 of the cylinder block, and into which the skirt portion 26 extends when the piston 24 is in its lower position, this chamber being in communication at its lower end with a passageway 68, formed in the cylinder block, whose upper end opens into the combustion chamber 13, when the piston 24 is in its downmost position, and is closed by the piston 24 when the piston moves upwardly in the cylinder. The cylinder block is provided with an exhaust port 70, in communication with the interior of the cylinder, and which leads to the exterior of the block, and which is positioned to be in registration with a port 72 in the piston 24, when the piston 24 is in its upmost position in the cylinder.

It will be apparent from an inspection of the drawings that with the arrangement of ports described above, the exhaust port 58 and the passageway 68 will be in communication with the combustion chamber 13 when the piston 24 is in its downmost position in the cylinder, to admit air to the combustion chamber and exhaust the products of combustion therefrom, and the inner combustion chamber 32 will be in communication with the exhaust port 70 and with the passageway 62, through the port 60 and 72 of the outer piston, whereby air under pressure will be blown from the chamber 50 through the outer piston beneath the inner piston to aid in cooling the engine, as best seen in Figure 3 of the drawings.

The cylinder head 14 has a fuel pipe 74 connected thereto, which is in communication with the combustion chamber 12, and through which fuel under compression may be injected into the outer combustion chamber in the same manner as in an engine of the diesel type. The cylinder head 14 is also provided with an upward tubular extension 78, through which a fuel pipe 80 is slidable, whose lower end is connected to the piston 24, and is in communication with the combustion chamber 32, whereby fuel under pressure may be injected into the inner combustion chamber in the same manner as fuel is injected into the outer combustion chamber, as by means of a branch pipe 82, connected to the extension 78, in communication with the fuel pipe 80, through an opening 84, therein, positioned to permit the injection of fuel into the inner combustion chamber immediately prior to the firing of the same, as best seen in Figure 4. Suitable means, such as the packing, indicated at 86, is provided, surrounding the fuel pipe 80, to form a seal between the same and the interior of the extension 78, whereby leakage from the upper combustion chamber 12 is prevented.

In the operation of the engine as illustrated in Figures 3 to 6, inclusive, the inner and outer pistons are shown in Figure 3 in the positions which they will occupy at the time that fuel is injected into the upper combustion chamber 13 and firing takes place. With the pistons in the positions illustrated in Figure 3 the exhaust port 70 is in communication with the interior of the piston 24 beneath the piston 42 through port 72 and the chamber 50 is in communication with the interior of the piston 24 beneath the piston 42 through the passageway 62 and port 60, whereby a blast of cooling air is blown into the outer piston. The exhaust port 58 of the upper combustion chamber is closed by the skirt portion 26 of the piston 24, while the passageway 68 is closed off from communication with the combustion chamber and the chamber 66 is open to the atmosphere through port 64, to receive a charge of air.

Upon firing of the upper combustion chamber the outer and inner pistons 24 and 42 will move down together, the outer piston rotating the small gear 40 a half turn, while the inner piston is moved downwardly due to the rotation of the large gear 48 with the small gear 40.

In this manner the large gear 48 is turned one quarter turn upon rotation of the small gear one-half turn so that the inner and outer pistons move downwardly simultaneously to the positions indicated in Figure 4. It will also be seen that the connecting rods 34 and 44 are connected to the gears 40 and 48 respectively, in the upmost positions of the outer and inner cylinders at points which are somewhat off center, so that the gears may rotate readily upon firing of the upper combustion chamber.

When the pistons reach the positions illustrated in Figure 4, the exhaust port 58 will be opened and the passageway 68 will be in communication with the interior of the combustion chamber 13, whereby air from the chamber 66 will be blown into the upper combustion chamber while the products of combustion are exhausted therefrom, the outer piston being provided with suitable baffle means, such as that indicated at 88, of usual construction, whereby the air entering the combustion chamber 13 is prevented from passing directly out through the exhaust port. The exhaust port 70 will be closed to communication with the interior of the outer piston and the passageway 62 will be out of communication with the interior of the outer piston while the chamber 50 will be in communication with the interior through the intake port 56, to permit air to be drawn into the chamber. Fuel is injected into the inner combustion chamber 32 through the fuel pipe 80 and firing then takes place in the inner combustion chamber, whereupon the parts will be moved to the positions illustrated in Figure 5, wherein the outer piston 24 has moved upwardly to shut off communication between the passageway 68 and the interior of the combustion chamber and also to close the exhaust port 58, whereby the air in the upper combustion chamber will be compressed. At the same time the inner piston 42 moves downwardly to rotate the large gear 48 one quarter turn to the positions shown in Figure 5, thus rotating the small gear 40 one half turn to bring the same back to the position illustrated in Figure 3. When the inner piston reaches the position illustrated in Figure 5, the exhaust port 70 will be in communication with the combustion chamber 32 through the port 72 of the outer piston, while the passageway 62 from the chamber 50 will also be in communication with the inner combustion chamber through the port 60, so that air from the chamber 50 will be blown into the inner combustion chamber and products of combustion will be exhausted therefrom, the inner piston being provided with suitable baffle means, such as that indicated at 90, positioned in the usual manner, to prevent the inflowing air from being immediately exhausted through the exhaust port 70 with the products of combustion.

With the pistons in the positions indicated in Figure 5 fuel is again injected into the upper combustion chamber 13 and ignited therein, whereupon the outer piston will move downwardly to the position indicated in Figure 6 and the inner piston will move upwardly to the position shown in that figure. Upon upward movement of the inner piston the air admitted to the combustion chamber 32 will be compressed, and when the outer piston reaches its downmost position the products of combustion will be exhausted therefrom and air will be admitted to the combustion chamber 13 through the passageway 68 in the manner previously described. From the positions of the cylinders illustrated in Figure 6, the pistons then move together to the positions illustrated in Figure 3, and the pistons remain in the same position relative to each other until they are in the position of Figure 4, whereupon fuel is again injected into the inner combustion chamber through the fuel pipe 80.

It will thus be seen that firing takes place in the upper combustion chamber 13 twice during one rotation of the large gear 48, while the lower combustion chamber fires only once during such rotation.

The form of the invention illustrated in Figures 7 to 10, inclusive, is very similar to that illustrated in Figures 3 to 6, except that the upper air supplying chamber 66 is not provided, and the cylinder head 14' is provided with an air intake passageway 92, and an exhaust passageway 94, these passageways being in communication with the upper combustion chamber 13' through ports 96 and 98, respectively, under the control of valve mechanism of usual construction, including the valves 100 and 102, respectively, which are adapted to be opened and closed in the usual manner, as by means of conventional cam actuated valve mechanism, not shown. In this form of the invention a fuel injector pipe 74' is provided, connected to the cylinder block, and leading into the interior of the combustion chamber 13', while the same fuel pipe 80 is connected to the outer piston 24', and leads into the inner combustion chamber 32'.

In the embodiment of the invention illustrated in Figures 7 to 10, the inner piston 42 is adapted for two cycle operation, while the outer piston is adapted for four cycle operation.

In the operation of the invention as illustrated in Figures 7 to 10, Figure 7 shows the pistons in their uppermost positions in the cylinder, the valve 100 being opened to admit air to the upper combustion chamber upon downward movement of the outer piston, while the inner piston is in a position to compress air in the upper combustion chamber 32. In this position of the parts it will also be seen that the passageway 62 from the chamber 50 is in communication with the interior of the outer piston beneath the inner piston through the port 60, and the exhaust port 70 is also in communication with the interior of the outer piston through the port 72, whereby cooling air from the chamber 50 is blown into the outer piston to aid in cooling the engine.

In Figure 8 the pistons are shown in the positions which they occupy immediately after the positions illustrated in Figure 7, wherein the outer piston has moved to its downmost position, while the inner piston has also moved downwardly with the outer piston, the small gear 40 being rotated one half turn, while the large gear is rotated one quarter turn, the exhaust port 70 and the passageway 62 being now closed off from communication with the interior of the outer cylinder, and the valve 102 being in closed position after a charge of air has been drawn into the upper combustion chamber 13'. The air chamber 50 is now also in communication with the exterior through the intake port 54, to permit the charge of air to enter the chamber. With the parts in the positions illustrated fuel is injected into the inner combustion chamber 32 through fuel pipe 80 and ignition then takes place.

The pistons are illustrated in Figure 9 in the positions which they occupy immediately after the positions illustrated in Figure 8, the inner piston now being in its downmost position in the outer piston while the outer piston is in its uppermost position in the cylinder. In this condition of the engine the upper combustion chamber is now in condition for firing, and fuel is injected into the upper combustion chamber through the fuel pipe 74', whereupon ignition immediately takes place. The inner combustion chamber 32' is now also in communication with the exhaust port 70 through the port 72 and with the passageway 62 through port 60, whereby a charge of air is introduced into the inner combustion chamber from the chamber 50, while products of combustion are exhausted therefrom. Upon firing of the upper combustion chamber, the pistons are moved to the positions illustrated in Figure 10, wherein the inner piston is in its downmost position in the cylinder, while the inner piston has moved upwardly in the outer piston, to compress air in the inner ignition chamber 32. The exhaust valve 102 is now in open position, to permit exhaust of the products of combustion from the combustion chember 13', as soon as the outer piston again moves upwardly in the cylinder. The chamber 50 is also now again in communication with the exterior through the port 56, whereby a new charge of air is drawn into the chamber, while the exhaust port 70 and passageway 62 are closed off from communication with the interior of the inner piston.

From the positions of Figure 10 the pistons move again to the positions illustrated in Figure 7, wherein the air in the inner combustion chamber remains under compression, while the intake valve 100 of the outer combustion chamber is opened to permit a charge of air to be drawn into the outer combustion chamber upon the movement of the pistons to the positions of Figure 8.

It will be apparent that in this embodiment of the invention the outer combustion chamber fires only once during one revolution of the large gear 48, while ignition takes place twice in the inner combustion chamber during such rotation of the large gear.

The engine of the invention may be operated either as a conventional gasoline powered engine or as an engine of the diesel type, and when operated by gasoline as fuel, it will be apparent that suitable valve means, of conventional design, not shown, is provided to control the intake of fuel to the inner combustion chamber 32 through the chamber 50, so that fuel enters the chamber 50 only in the positions illustrated in Figures 4 and 8, while air alone is permitted to enter the chamber 50 in the positions of the pistons illustrated in Figures 6 and 10.

A further embodiment of the invention is illustrated in Figures 11 to 14, wherein the engine is of the diesel type, both the inner and the outer piston being arranged for two cycle operation.

In this form of the invention the outer piston is of relatively thin walled construction, whereby the diameter of the inner piston may be made only slightly less than the diameter of the outer piston. The outer piston 24" is provided with an external enlargement 52" mediate its ends which is movably disposed in an annular chamber 50" formed between the outer piston and the cylinder block 10" and the cylinder block is provided with a passageway 104 which is in communication with the lower end of the chamber 50" and with the upper combustion chamber 13" when the outer piston 24" reaches its lowermost position in the cylinder. An exhaust port 105 is also provided in the cylinder block 10" for the upper combustion chamber 12". The cylinder block 10" also has a port 106 which leads from the exterior to the interior of the chamber 50" and which is in communication with the chamber 50" through a port 108 in the enlargement 52" when the outer piston 24" is in its upmost postion, whereby air is admitted into the chamber 50" and supplied therefrom under pressure through passageway 104 into the cylinder above the outer piston 24". The cylinder block also has a passageway 110 which is in communication with the combustion chamber 32" above the inner piston 42" through a port 112, as seen in Figures 11 and 13, when the outer piston is in uppermost position, and which is also in communication with a chamber 114 formed by an inward, lower end extension 116 of the outer piston 24" through a port 118 in the outer piston when the outer piston is in uppermost position. An exhaust port 113 is formed in piston 24" which is in registration with a passageway in the cylinder block, not shown, leading to the exterior, when piston 24" is in uppermost position and through which exhaust from combustion chamber 32" may take place.

The inner piston 42" has an external, downwardly extending skirt 120 which extends into the chamber 114 when the inner piston is in its lowermost position, as seen in Figure 13, whereby air drawn into the chamber 114 will be compressed and supplied through port 118, passageway 110 and port 112 to the combustion chamber 32″. When the outer piston is in its downmost position air from the exterior may enter the chamber 114 through port 118 and a passageway 122 formed in the cylinder block as seen in Figures 12 and 14.

The inner piston 42″ has a downward extension 124 which is connected to the large gear 48 by a piston rod 44 and the outer piston is connected to the small gear 40 by a piston rod 34.

In other respects the form of the engine of the invention illustrated in Figures 11 to 14 is similar to that shown in Figure 3 to 6.

As seen in Figure 11 the outer piston is in its uppermost position, the upper combustion chamber 13″ being filled with compressed air so that upon the injection of fuel into the combustion chamber through fuel supply pipe 74 firing will take place. The air chamber 50″ is now also filled with air through ports 106 and 108, which are now in registration, and air is also compressed in the lower combustion chamber 32″. When ignition takes place in combustion chamber 13″, both the outer and inner pistons move downwardly to the position of Figure 12, whereupon air from chamber 50″ will be blown into the combustion chamber 13″ through passageway 104 and at the same time products of combustion will be exhausted through exhaust port 105.

When the pistons reach the position illustrated in Figure 12 fuel may enter the lower combustion chamber 32″ through fuel pipe 80 and ignition then takes place in the lower combustion chamber. Air is also admitted to air chamber 114 through port 118 and passageway 122. The inner piston then moves downwardly to the position of Figure 13, while the outer piston at the same time moves upwardly to compress the air in combustion chamber 13″.

When the pistons reach the positions shown in Figure 13 air from chamber 114 is blown into combustion chamber 32″ through port 118, passageway 110 and port 112, while at the same time products of combustion are exhausted through port 113.

Ignition takes place in the upper combustion chamber in the position shown in Figure 13 and the outer piston moves downwardly to the position of Figure 14 while the inner piston moves upwardly to compress the air in lower combustion chamber 32″.

Suitable means, such as a fuel valve of conventional design, arranged to be operated in any desired manner as by well known cam mechanism actuated by the engine, also not shown, may be provided for preventing the injection of fuel into combustion chamber 32″ while the parts are in the position shown in Figure 14, but which permits the injection of fuel into chamber 32″ when the parts reach the position of Figure 12, so that no firing in chamber 32″ takes place in the position of Figure 14.

The positions of the connecting rods 44 and 34 during the operation of the invention as illustrated in Figures 11 to 14, and the actuation of the gears 40 and 48 will be the same as in the form of the invention illustrated in Figures 3 to 6.

It will be apparent that with the arrangement illustrated in Figures 11 to 14 the outer piston receives two power impulses and the inner piston receives one power impulse during each revolution of the large gear 48. By providing an engine having two such arrangements of pistons arranged to drive the same arrangement of gears, six power impulses may be obtained during each revolution of the large driving gear 48, while in an internal combustion of ordinary two-cycle construction would require six cylinders to accomplish the same number of power impulses per revolution.

A further modified form of the invention is illustrated in Figures 15 and 16, wherein the construction of the engine is similar to that illustrated in Figures 11 to 14, both the inner and outer pistons being arranged for two-cycle operation. The upper combustion chamber 13″ has a spark plug 130 and the lower combustion chamber 32″ has a spark plug or glow plug 132 whereby ignition in the chambers may be accomplished. The outer piston 24″ in this form of the invention has an opening 138 therethrough which is moved into registration with a passageway 136 into which the spark plug 132 extends, and also with a passageway 140 in the inner piston 42″ which is in communication with the interior of lower combustion chamber 32′, whereby ignition may take place in the positions of the parts illustrated in Figure 15.

The outer piston is also provided with an opening corresponding to the opening 72 and the cylinder block has an opening 70 positioned to be in registration to permit the exhaust of products of combustion from the lower combustion chamber at the exhaust stage of the operation of the inner piston, in a manner similar to that illustrated in Figures 8 to 10, but which openings are not visible in Figures 15 and 16.

In Figure 16, the parts are illustrated in the same stage of the operation of the engine as that shown in Figure 14 wherein fuel and air are compressed in lower combustion chamber 32″, but ignition in the lower chamber does not take place because the opening 138 of outer piston 24″ is out of registration with the passageways 136 and 140. When the parts reach the positions of Figure 15, corresponding to those illustrated in Figure 12, the opening 138 will be in registration with passageways 136 and 140 so that ignition then takes place in the lower combustion chamber.

By suitably connecting the lower end of the piston rod 44 to the gear 48 at a point such that it will be located somewhat more than 270 degrees from its position when the inner piston is in its upmost position, as shown in Figure 16, the lower combustion chamber will be of greater volume than at full compression, and when the parts reach the positions shown in Figure 15 the lower end of the piston rod 44 will be somewhat less than 90 degrees from its upmost position, so that maximum compression will take place in the lower combustion chamber at the time of ignition therein. Thus, the opening 138 will be in registration with the passageways 136 and 140 at the time maximum compression takes place, and ignition can be accomplished without the provision of additional timing mechanism.

A still further modified form of the invention is illustrated in Figures 17 and 18, wherein the construction of the engine is similar to that illustrated in Figures 7 to 10, the outer piston being arranged for two-cycle operation while the inner piston is arranged for four-cycle operation.

In this form of the invention, the upper combustion chamber has a spark plug 130′ and the lower combustion chamber has a spark plug or glow plug 132′ which is fitted into a passageway 136′ with which an opening 138′ in piston 24′ and a passageway 140′ in piston 42″ are in registration to permit ignition in the lower chamber when the parts are in the positions shown in Figure 17. The lower end of the piston rod 44 is connected to gear 48 in the same manner as described above in connection with the form of the invention illustrated in Figures 15 and 16, so that fuel and air are compressed in lower chamber 32″ to the extent shown in Figure 18 while the opening 138′ is out of registration with passageways 136′ and 140′ and full compression takes place as shown in Figure 17 at the time opening 138′ is in registration with passageways 136′ and 140′ at which time ignition is accomplished. The upper combustion chamber 13′ in this case is provided with intake and exhaust valves 100 and 102 similar to those illustrated in Figures 7 to 10, whereby the upper chamber is adapted for four-cycle operation.

In the forms of the invention illustrated in Figures 15 and 16 and Figures 17 and 18, means is provided whereby timing of the ignition in the lower chamber takes place automatically by the relative movements of the pistons without the necessity for the provision of any additional timing mechanism.

It will thus be seen that the invention, constructed and operated in the manner described above provides an internal combustion engine of simple design and rugged construction, which may be operated in a number of different ways, and in which the pistons are operatively connected together for positive simultaneous movement relative to each other at all times. In an engine constructed in accordance with the invention, power is delivered to the drive shaft throughout a greater portion of the movement of the pistons than would be the case in an engine of conventional construction, whereby smoother and more efficient operation is attained.

The invention has been disclosed herein in connection with certain specific embodiments of the same, but it will be understood that these are intended by way of illustration only, and that numerous changes can be made in the particular construction and arrangement of the parts, without departing from the spirit of the invention or the scope of the appended claims.

Having thus clearly shown and described the invention, what is claimed as new and desired to secure by Letters Patent, is—

1. In an internal combustion engine a cylinder, a cylinder head on one end of the cylinder, a sleeve-like piston movably disposed in the cylinder and having a closed upper end positioned to form between it and said head an upper combustion chamber, an inner piston movably disposed in the sleeve-like piston and forming therewith a lower combustion chamber, a large gear connected to the inner piston to be rotated thereby upon movement of the inner piston, a small gear connected to the sleeve-like piston to be rotated thereby upon movement of the sleeve-like piston and in intermeshing engagement with said large gear, said large gear being of a size to rotate once during two rotations of said small gear.

2. In an internal combustion engine a cylinder, a cylinder head on one end of the cylinder, a sleeve-like piston movably disposed in the cylinder and having a closed upper end positioned to form between it and said head an upper combustion chamber, an inner piston movably disposed in the sleeve-like piston and forming therewith a lower combustion chamber, connecting rods pivotally connected at their upper ends to the pistons, a large gear connected to the lower end of one of the piston rods to be rotated thereby, a small gear connected to the lower end of the other piston rod to be rotated thereby, said gears being in intermeshing engagement, the lower end of said one connecting rod being in a position displaced ninety degrees from the position of the lower end of said other connecting rod at the time of ignition in said lower chamber.

3. In an internal combustion engine a cylinder, a cylinder head on one end of the cylinder, a sleeve-like piston movably disposed in the cylinder and having a closed upper end positioned to form between it and said head an upper combustion chamber, an inner piston movably disposed in the sleeve-like piston and forming therewith a lower combustion chamber, connecting rods pivotally connected at their upper ends to the pistons, a large gear connected to the lower end of one of the piston rods to be rotated thereby, a small gear connected to the lower end of the other piston rod to be rotated thereby, said gears being in intermeshing engagement, said pistons being arranged for two cycle operation and being in their upmost positions at one time of ignition in said upper chamber and said inner piston being in lowermost position at another time of ignition in said upper chamber.

4. In an internal combustion engine a cylinder, a cylinder head on one end of the cylinder, a sleeve-like piston movably disposed in the cylinder and having a closed upper end positioned to form between it and said head an upper combustion chamber, an inner piston movably disposed in the sleeve-like piston and forming therewith a lower combustion chamber, connecting rods pivotally connected at their upper ends to the pistons, a large gear connected to the lower end of one of the piston rods to be rotated thereby, a small gear connected to the lower end of the other piston rod to be rotated thereby, said gears being in intermeshing engagement, said pistons being arranged for two cycle operation and being in their uppermost positions at one time of ignition in said upper chamber and said sleeve-like piston being in its lowermost position at the time of ignition in said lower chamber.

5. In an internal combustion engine a cylinder, a cylinder head on one end of the cylinder, a sleeve-like piston movably disposed in the cylinder and having a closed upper end positioned to form between it and said head an upper combustion chamber, an inner piston movably disposed in the sleeve-like piston and forming therewith a lower combustion chamber, connecting rods pivotally connected at their upper ends to the pistons, a large gear connected to the lower end of one of the piston rods to be rotated thereby, a small gear connected to the lower end of the other piston rod to be rotated thereby said gears being in intermeshing engagement, said sleeve-like piston being arranged for four cycle operation and said inner piston being arranged for two cycle operation and said sleeve-like piston being in its lowermost position at the time of ignition in said lower chamber.

6. In an internal combustion engine a cylinder, a cylinder head on one end of the cylinder, a sleeve-like piston movably disposed in the cylinder and having a closed upper end positioned to form between it and said head an upper combustion chamber, an inner piston movably disposed in the sleeve-like piston and forming therewith a lower combustion chamber, connecting rods pivotally connected at their upper ends to the pistons, a large gear connected to the lower end of the piston rod of said inner piston to be rotated thereby, a small gear connected to the lower end of the piston rod of said sleeve-like piston to be rotated thereby, said gears being in intermeshing engagement, the lower end of said connecting rod of said inner piston being in a position displaced less than ninety degrees from its upmost position at the time ignition in said lower chamber takes place.

7. In an internal combustion engine a cylinder, a cylinder head on one end of the cylinder, a sleeve-like piston movably disposed in the cylinder and having a closed upper end positioned to form between it and said head an upper combustion chamber, an inner piston movably disposed in the sleeve-like piston and forming therewith a lower combustion chamber, connecting rods pivotally connected at their upper ends to the pistons, a large gear connected to the lower end of the piston rod of said inner piston to be rotated thereby, a small gear connected to the lower end of the piston rod of said sleeve-like piston to be rotated thereby, said gears being in intermeshing engagement, the lower end of said connecting rod of said inner piston being in a position displaced less than ninety degrees from its upmost position and the lower end of the piston rod of said sleeve-like piston being in its lowermost position at the time of ignition in said lower chamber.

References Cited in the file of this patent

UNITED STATES PATENTS

| 928,405 | Simon | July 20, 1909 |
| 1,563,733 | Ewart | Dec. 1, 1925 |
| 1,925,754 | Hagan | Sept. 5, 1933 |

FOREIGN PATENTS

| 23,033 | Australia | Oct. 21, 1930 |